US005176296A

United States Patent [19]

Lina et al.

[11] Patent Number: 5,176,296

[45] Date of Patent: Jan. 5, 1993

[54] PRECOMPRESSION METERING-PROPORTIONING PUMP ENABLING ITS EFFICIENCY TO BE IMPROVED BY EARLY ADMISSION INTO THE PUMP WORKING SPACE

[75] Inventors: Jean-Pierre Lina, Le Neubourg; Hervé Pennaneac'h, Verneuil-Sur-Avre, both of France

[73] Assignee: Valois (societe anonyme), Le Neubourg, France

[21] Appl. No.: 741,710

[22] Filed: Aug. 7, 1991

[30] Foreign Application Priority Data

Aug. 7, 1990 [FR] France .............................. 90 10076

[51] Int. Cl.⁵ .............................................. G01F 11/30

[52] U.S. Cl. .................................. 222/321; 222/385; 137/854; 417/550

[58] Field of Search ........... 222/321, 383, 385, 402.1; 137/854; 417/550

[56] References Cited

U.S. PATENT DOCUMENTS

| | | | |
|---|---|---|---|
| 3,991,914 | 11/1976 | Kotuby et al. | 222/321 |
| 4,089,442 | 5/1978 | Hafele et al. | 222/385 |
| 4,262,823 | 4/1981 | Monden | 222/383 |
| 4,856,677 | 8/1989 | Brunet et al. | 222/321 |
| 4,896,799 | 1/1990 | Giuffredi | 222/321 |
| 4,966,535 | 10/1990 | Lina et al. | 417/553 |
| 5,105,994 | 4/1992 | Jouillat et al. | 222/321 |

FOREIGN PATENT DOCUMENTS

| | | | |
|---|---|---|---|
| 2433982 | 3/1980 | France . | |
| 1406262 | 6/1985 | France . | |
| 2558214 | 7/1985 | France . | |
| 1112531 | 5/1968 | United Kingdom | 222/321 |

*Primary Examiner*—Andres Kashnikow
*Assistant Examiner*—Philippe Derakshani
*Attorney, Agent, or Firm*—Sughrue, Mion, Zinn, Macpeak and Seas

[57] ABSTRACT

Product admission into the working chamber 23 of a precompression pump is accelerated by providing a differential piston 4 with a bore 63 which establishes communication between the inside of a skirt 42 and a shoulder 44. A cylindrical sealing element 60 is fitted over a spindle 41 to be applied against the shoulder 44, level with two annular contacts 64, 65 between which the bore terminates. The sealing element closes the bore on discharge of the precompressed product dose. The sealing element is configured such that, particularly when the pump is idle, it is kept deformed and is therefore applied to the shoulder 44 with sufficient force to guarantee the seal of the two annular contacts 64, 65.

15 Claims, 6 Drawing Sheets

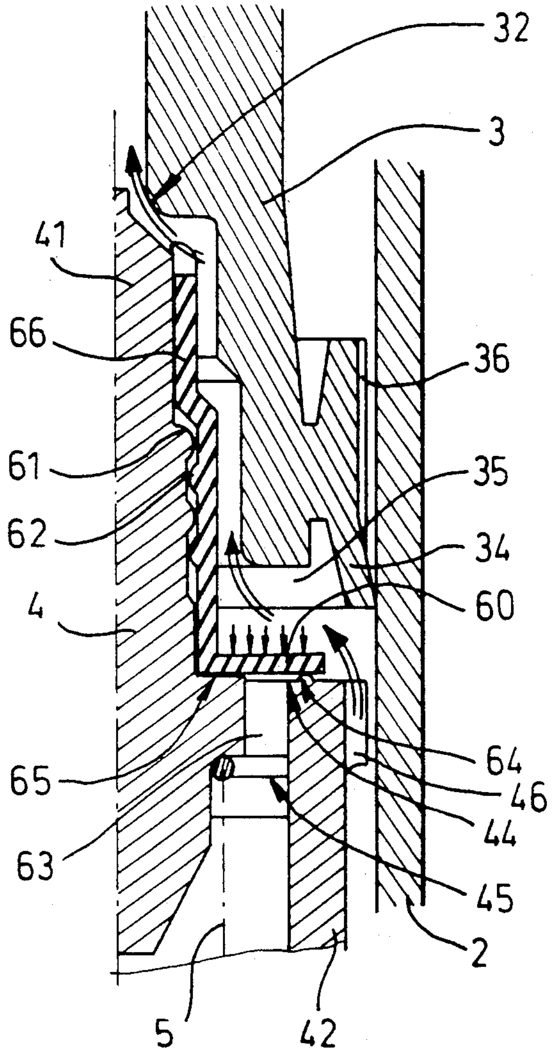
FIG.9
FIG.10
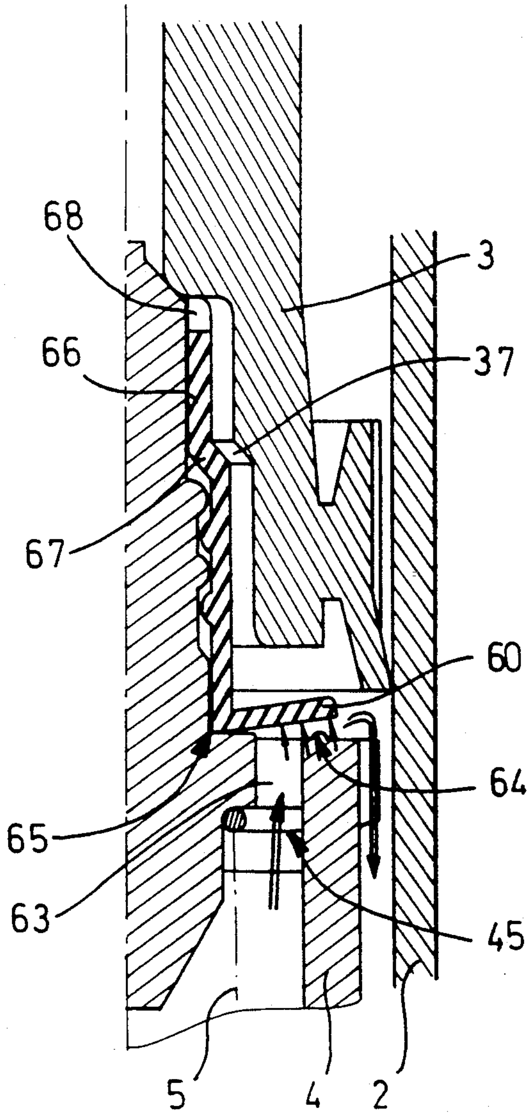

PRECOMPRESSION METERING-PROPORTIONING PUMP ENABLING ITS EFFICIENCY TO BE IMPROVED BY EARLY ADMISSION INTO THE PUMP WORKING SPACE

BACKGROUND OF THE INVENTION

The present invention relates to a precompression metering-proportioning pump used to discharge an essentially liquid product in the form of an aerosol. More precisely, it concerns an improvement to such a pump which notably enhances its efficiency (defined as the ratio of the volume of the dose discharged to the volume of the pump's working space). This improvement allows the pump's working space to be almost totally filled by enabling the product to be sucked into it as soon as the pistons of the pump begin to rise. In addition this mechanism operates in a very reliable manner.

In fact, the efficiency enhancement method discussed herein has been known for a number of years. However, it has been implemented using systems with varying degrees of success. In order to demonstrate their deficiencies we shall first describe a precompression metering-proportioning pump of the prior art that these systems have endeavoured to render more efficient. For this, we shall refer to the longitudinal section represented in FIG. 1 of the drawings.

FIG. 1 shows a precompression meteringproportioning pump designed according to the principle invented by Rudolph Albert described in French patent FR 1 486 396 filed in 1966. This patent also involved the use of a more advantageous inlet valve, the design of which is described in the certificate of addition FR 2 305 241 filed in 1975 by Société Technique de Pulvérisation (STEP). This pump comprises five cylindrical parts designed to be mounted so that their respective axes of revolution are the same. In FIG. 1, the axis of the assembly is disposed vertically, admission to the working space of the pump being via the bottom from a vessel (not shown), while discharge to the free air takes place via the top. The five parts of the pump are:

a turret 1 whose base 11 allows the pump to be secured to the vessel containing the product to be discharged, a hollow casing 2 onto an open end 21 of which the turret 1 locks while at its other end, a sleeve allows the pump to be connected to a plunger tube (not shown), a first piston 3 sliding inside the hollow casing 2 and delimiting with the hollow casing 2 the pump's working space 23. This first piston 3 extends upwards in the form of a hollow rod 31 with a value seat 32 at its halfway point, a second piston 4 called hereinunder a differential piston, sliding inside the hollow casing 2 within the pump's working space 23. The differential piston 4 is extended upwards by a valve spindle 41 engaging in the hollow rod 31 to rest against the valve seat 32. In the downwards direction, it ends in a skirt 42 housing at its bottom end a sealing lip 43. It is designed to cooperate with a hollow cylinder 24 integral with the pump casing 2 over which the skirt 42 can fit, and a return spring 5 disposed between the base of the pump casing 2 and the differential piston 4.

These five parts, shown in the idle position of the pump in FIG. 1, cooperate in the following way. When the user of the pump presses on the hollow rod 31 of the first piston 3 (for example using a pushbutton, not shown), he causes the first piston 3 to descend into the pump casing 2. Through its movement the piston 3 drives the differential piston 4, the valve spindle 41 of which is held against the valve seat 32 through the intermediary of the spring 5. From this moment, guided by external vanes of the skirt 42, the sealing lip 43 is applied against the outer surface of the hollow cylinder 24 and thus isolates the pump's working space 23 from the vessel. At the same time, the volume of the working space falls to the extent that the pressure of the product that it contains increases. When this pressure reaches a "precompression" threshold related to the stiffness of the spring 5, the conformation of the differential piston 4 (and in particular the existence of the broad shoulder 44 at the base of the valve spindle 41) causes the valve spindle 41 to move away from the valve seat 32. The product under pressure then flows along the internal channel 33 of the hollow rod 31. The discharge continues until the differential piston 4 comes to rest against the hollow cylinder 24 level with an end of travel disengaging device 45 defined internally by the skirt 42.

Then, with the volume of the pump's working space 23 no longer decreasing, the pressure of the product that it contains falls. This pressure is now no longer capable of opposing the spring 5 to the extent that the valve spindle 41 returns against its seat 32 and closes the passage to the outside. The user then stops pressing on the rod 31 and the spring 5 causes the two pistons to re-ascend into the pump casing 2. The volume of the pump's working space 23 then increases. However, the sealing lip 43 does not immediately leave the outer surface of the hollow cylinder 24. During this interval, the pressure in the pump's working space 23, totally isolated, falls. Therefore, as soon as the lip 43 leaves the cylinder 24, a strong suction action causes the product in the vessel to penetrate into the working space 23 via the sleeve 22.

The efficiency of the pump depends largely on this last phase of filling the pump's working space 23. For it to approach 100%, almost all of the working space 23 should end up occupied by the product. Now, in the pump of the prior art represented in FIG. 1, this condition is never fulfilled. A substantial vacuum develops in the working space 23 while the sealing lip 43 of the skirt 42, still in contact with the cylinder 24 circulates along the cylinder 24. Often, it is so strong that it causes an intake of outside air at the level of the peripheral lips 34 of the first piston 3. From this moment, the volume of the working space 23 occupied by air is not available for the product.

This phenomenon leads to a number of disadvantages. First of all, since the quantity of air taken in cannot be controlled, the 15 complementary volume of the pump's working space, which is occupied by the product and which constitutes the dose eventually discharged, is itself irregular. Then, if a precise minimum dose must be provided, it is necessary to provide for a larger working space, or a more voluminous pump casing. To attempt to reduce the air intake, the first piston 3 must be fitted with more airtight peripheral lips 34. They then cause greater friction of the first piston 3 against the pump casing 2 to the extent that a less flexible spring 5 must be used. In all cases, the market for the pump is more restricted through its irregularity, its volume or its difficulty of operation.

To overcome this defect of the precompression metering-proportioning pump of the prior art, a number of arrangements have been devised. The aim of all of them is to avoid too great a vacuum developing within the pump's working space with the resultant undesirable intake of air. For this, they attempt to establish a communication as early as possible between the product vessel and the pump's working space as soon as the pistons rising cause the volume of the working space to increase.

To this end, U.S. Pat. No. 4,089,442 filed by Hafele et al in 1976 provides for a number of bores within the differential piston 4 in the form of small cylindrical holes linking the inside of the skirt 42 and the surface of the shoulder 44. In addition, a flange is applied to the surface of the shoulder 44, sliding over the valve spindle 41. The bores and the flange are then supposed to behave as a non-return valve, the flange blocking the bores or conversely unblocking them according to whether the pressure in the pump's working space is above or below atmospheric pressure. In practice, this valve does not always work. It is sufficient for example for the flange to be slightly unevenly positioned around the valve spindle 41. It then blocks in a more or less open position which, if it does not prevent, at least impedes the pressurization of the pump's working space and therefore discharge of the product to the outside.

In 1984, the company VALOIS filed French patent FR 2 558 214 eliminating the flange. Instead, the bores end in a slender projection in the shape of a slot. Through their elasticity, the lips of the slot then act directly as a non-return valve. This system, although more effective than the preceding system, nevertheless has a disadvantage. To be able to make the projections, it is necessary to use a fairly rigid plastics material. This means that the opening of the slots during intake into the pump's working space still requires a reasonably strong vacuum to be present. The problems linked to the intake of outside air are therefore not totally eliminated.

At the beginning of 1988 VALOIS therefore devised a skirt 42 in two parts with an idle or last motion link. This is described in French patent FR 2 631 564. As long as the pistons are moving downwards the two parts of the skirt 42 fit together to form a seal. However, the idle motion link allows the creation of a passage from the inside of the skirt 42 into the pump's working space 23 as the pistons rise, the sealing lip 43 rubbing against the cylinder 24 and thus opposing the upward movement of one of the parts of the skirt 42. In this case, there is nothing wrong with the implementation. It is rather the manufacture and inspection sampling of the two parts of the skirt and their link which renders the cost of the pump prohibitive.

SUMMARY OF THE INVENTION

This invention addresses the same problem as the three patents cited but solves it in such a way that precompression metering-proportioning pumps thus enhanced operate without risk and at the same time are cheap.

For this, an improvement has been developed enhancing the efficiency of a precompression metering-proportioning pump, said metering-proportioning pump enabling a product to be discharged under pressure through the collaboration of five cylindrical parts with a common axis:

a hollow turret or coupling sleeve, a hollow casing comprising two open ends, said turret being attached to a first end of said hollow casing while a hollow cylinder having an open section extends inside a second end of said hollow casing.

a first piston mounted to slide in an airtight fashion inside said hollow casing between a first and a second position, said first piston being applied against said turret in said first position, a hollow rod extending said first position to said first end of said hollow casing with a valve seat on its inside, a differential piston mounted to slide inside said hollow casing and comprising a shoulder on the side of said first end of said hollow casing, said differential piston extending to said first end of said hollow casing through a valve spindle engaging in said hollow rod of said first piston to cooperate with said valve seat, said differential piston extending to said second end of said hollow casing through a skirt having an outer guiding surface and an inner surface fitted with a disengaging device and a sealing lip, said sealing lip fitting around said hollow cylinder at least as soon as said first piston leaves said first position, said second position of said first piston being reached when said open section of said hollow cylinder comes to rest against said disengaging device of said inner surface of said skirt, and a return spring disposed between said differential piston and said second end of said hollow casing, said differential piston comprising in addition at least one bore starting from said inner surface of said skirt and opening onto said shoulder, a cylindrical sealing element fitted around said valve seat being adapted to be applied against said shoulder level with two annular contacts between which said bore opens to form a non-return valve at the opening of said bore and an open space around said shoulder so that said sealing element can detach itself from said shoulder, wherein, notably when said meteringproportioning pump is at rest, said sealing element is kept deformed so that it is applied against said shoulder with sufficient force to guarantee the seal of said two annular contacts.

More concretely, one of said two annular contacts between said sealing element and said shoulder consists of a supporting course projecting onto said shoulder between said bore and said outer surface of said skirt, the second of said two annular contacts being implemented on a surface of said shoulder located immediately next to said valve spindle and set back from said supporting course, said first contact being broken when said non-return valve at the opening of said bore opens, while said second contact is maintained permanently, said open space around said shoulder being adapted to allow said sealing element to bend towards said valve spindle while said first contact is broken.

According to one advantageous embodiment of this improvement, said sealing element is an elastomer seal having a central hole and an outer periphery. Notably when said metering-proportioning pump is at rest, said sealing element is kept deformed by:

a/ said valve spindle, said central hole of said seal having a diameter less than that of said valve spindle so that fitting said seal onto said valve spindle causes deformation of said seal; and b/ an embossment in said valve spindle located at a distance from said shoulder of said differential piston such that once fitted onto said valve spindle said seal is wedged level with said central hole between said embossment and said shoulder.

Said open space around said shoulder consists of an annular cavity in said first piston.

According to a second advantageous embodiment of this enhancement, said sealing element is a ring made of a plastics material having a central hole extended on one side by a cylindrical hollow sleeve which is adapted to fit onto said valve spindle and has an open end; and in that, notably when said metering-proportioning pump is at rest, said valve seat of said first piston is applied to said open end and presses said sleeve axially against said surface of said shoulder immediately next to said valve spindle. Preferably, said open end of said sleeve comprises at least one notch so that the presence of said sleeve does not impede the passage of said product when it is discharged. It is advantageously bevelled so that said first piston is automatically centered on said sleeve.

When the sealing element is a ring integral with a hollow cylindrical sleeve, said hollow cylindrical sleeve advantageously comprises at least two internal annular embossments, said valve spindle then comprising at least one external annular embossment intended to fit between said two annular embossments of said sleeve with an axial clearance compatible with the tolerance of the parts. Said annular embossments of said sleeve are preferably located level with a section of said sleeve widened with respect to said open end. In the same case, said open space round said shoulder consists of a cylindrical cavity having for its axis of revolution said common axis of said parts of said metering-proportioning pump, said cavity extending from said valve seat and presenting a widened section level with said widened section of said sleeve.

In a simple manner, said bore is a cylindrical channel with an axis parallel to said common axis of said parts of said precompression metering-proportioning pump. Said disengaging device of said inner surface of said skirt is preferably notched so as to disengage the beginning of said bore.

There may be two or three bores in said differential piston. They are then molded together with the differential piston.

Advantageously, said first piston slides in an airtight fashion inside said hollow casing through the effect of a single peripheral sealing lip directed towards the pump's working space.

Where applicable, said sealing element is manufactured by molding.

The precompression metering-proportioning pump including this improvement then all the advantages expected of an early communicating the vessel and the pump's working space increasing in volume:

compactness through an efficiency practically equal to 100%, and reduction of friction of the piston 3 against the casing 2, a single lip 34 now being sufficient. This leads to a return spring 5 which can be more flexible as the vacuum to be overcome is reduced, and less effort is required to actuate the piston 3 (for example dropping from 2.8 kg to 2.1 or even 2.0 kg).

The metering pump comprising the present improvement presents other advantages when it is used together with a vacuum vessel. For that purpose it is however necessary that the respective lengths of the hollow cylinder and of the skirt of the differential piston are such that the sealing lip always remains fitted around the hollow cylinder also when the first piston is in its first position, the communication with the pump's working space being consequently only possible through the at least one bore pierced in the differential piston.

When the product in the vacuum vessel beings to be evacuated from the vessel, its walls must indeed deform in order to adapt themselves to the reduction of the inner volume. But there is always a certain mechanical resistance against this deformation so that a relative depression develops in the vessel. This may induce the suction of some outer air through the pump surfaces, the sealing of which is not perfect. This specially arises between its piston 3 and its casing 2, particularly when the pump becomes a little older and its material has crept. It brings about the penetration of some outer air into the pump's working space 23.

Provided that the skirt 42 of the differential piston 4 remains fitted around the hollow cylinder 24, the working space 23 consequently communicates with the vessel only via the non-return valve provided according to the invention by the bore 63 in the differential piston 4. In this way, the product contained in the vessel has no chance to come into contact with the air which has penetrated the working space 23 as explained thereabove. This result is of particular interest when, in order to preserve the product, it is necessary to keep it away form the ambient air which could contaminate it, oxidize it and so on.

BRIEF DESCRIPTION OF THE DRAWINGS

There follows a description of embodiments of this invention illustrated by the appended drawings. In these drawings:

FIGS. 9 and 10 are details showing with greater precision the second embodiment of the present improvement. These are also longitudinal sections corresponding respectively to the product discharge phase and the pump's working space intake phase.

DETAILED DESCRIPTION OF THE PREFERRED EMBODIMENTS

Figure 1:
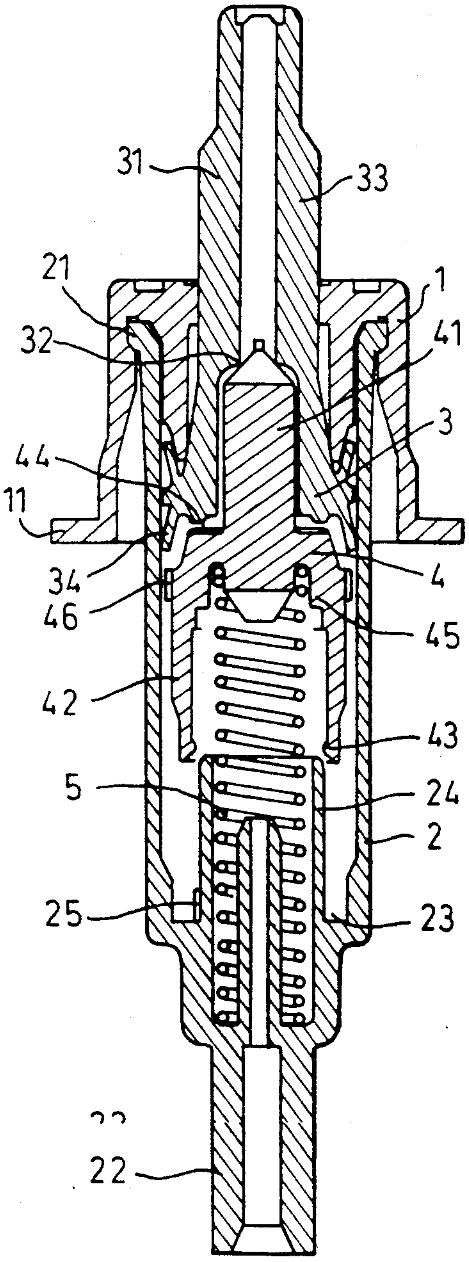
PRIOR ART FIG.1
FIG. 1 is a longitudinal section of a precompression metering-proportioning pump of the prior art shown in the idle position.

In the following paragraphs, we shall concentrate on the present improvement In fact, it affects only the two pistons of the precompression metering-proportioning pump of the prior art. To demonstrate this, let us compare for example FIG. 1 which shows the precompression metering-proportioning pump of the prior art and FIG. 2 which represents the same pump fitted with a first embodiment of the present invention. Three main changes can be discerned. We shall examine them here with reference to detail FIG. 6:

a) the differential piston 4 now has at least one bore 63 linking the inside of the skirt 42 with the surface of the shoulder 44. This bore 63 is in this case in the shape of a small vertical axis cylindrical hole In addition, the end of travel disengaging device or shoulder 45 defined internally by the skirt 42 is notched locally. Thus, the bore 63 is not totally blocked by the spring 5 which rests inside the skirt 42;

b) the piston 3 has at the bottom an annular cavity 35. In addition, there is now only one peripheral sealing lip 34 which is extended axially by simple guiding vanes 36;

c) an annular seal 60 surrounds the base of the valve spindle 41 and is applied against the shoulder 44 of the differential piston 4.

Rather than these three arrangements which are found in certain efficiency enhancement systems from the prior art, the present improvement according to the first embodiment essentially concerns the link between the seal 60 and the differential piston 4. The seal 60 is cut from an elastomer so that its central hole initially has a diameter less than that of the valve spindle 41. Thus, fitting the seal 60 onto the valve spindle 41 involves deforming it. This results in its surface becoming warped. The resulting concavity is directed towards the end of the spindle 41 through two embossments in the surface of the differential piston 4. One of these embossments (designated by reference numeral 61) encircles the spindle 41 at a distance from the shoulder 44 such that the seal 60 can be, wedged by it. The other embossment (designated by reference numeral 64) is on the surface of the shoulder 44 between the bore 63 and the peripheral guide vanes 46. It forms a supporting course or bead for the seal 60.

Figure 6:
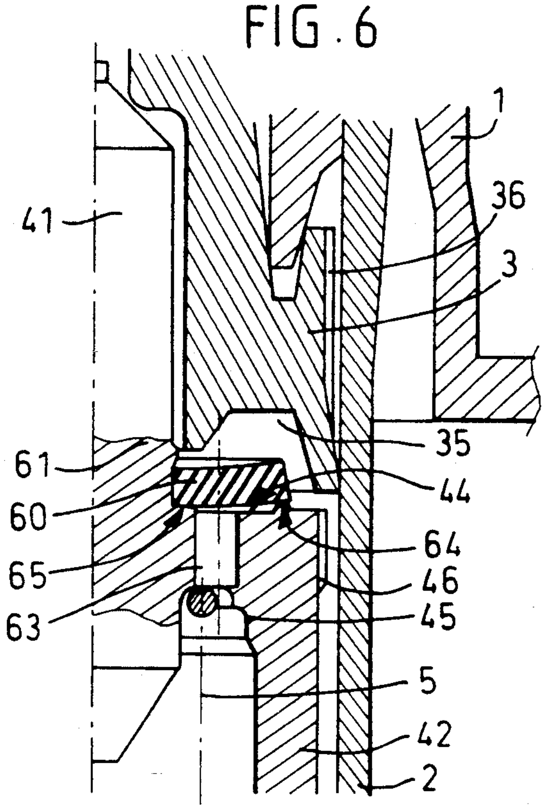
FIGS. 6 and 7 are details from FIGS. 2 and 5 respectively. They show in greater detail the first embodiment of the present improvement.
Figure 2:
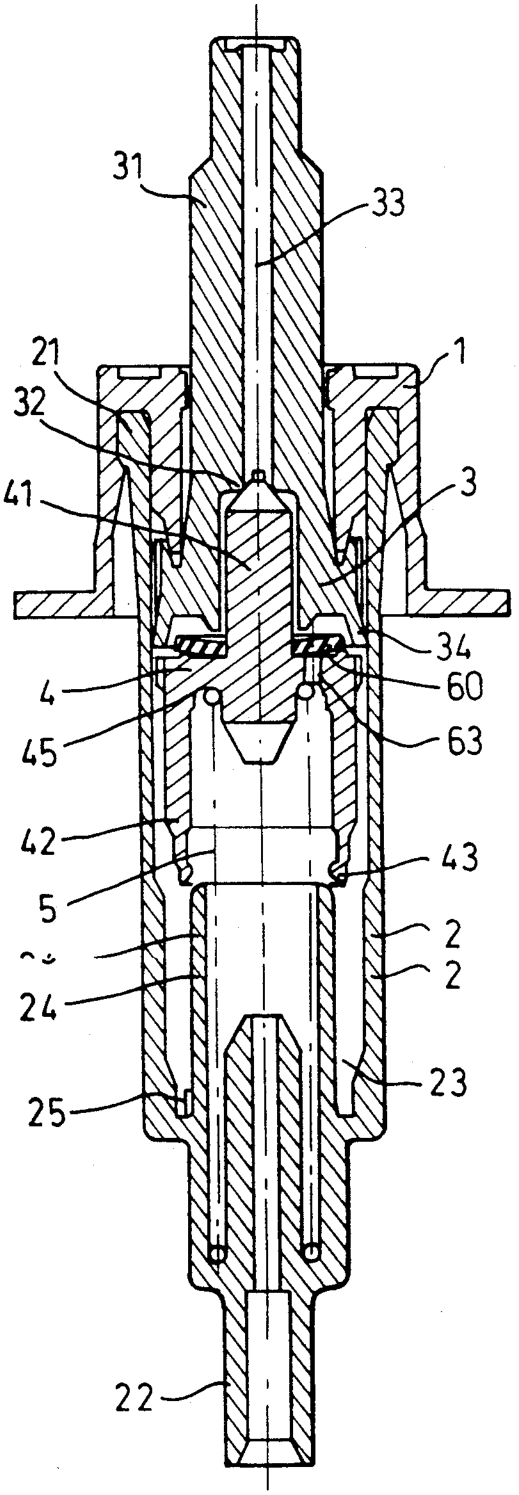
FIGS. 2 through 5 are longitudinal sections of the precompression metering-proportioning pump in FIG. 1, but this time including a first embodiment of the present improvement. This pump is shown in the idle position in FIG. 2, in the primary phase in FIG. 3, in the product discharge phase in FIG. 4 and during the pump's working space filling phase in FIG. 5.

The deformation imposed on the seal in this way, results, unlike similar systems in the prior art, in a mode of operation theoretically perfectly reproducible. When the pump is at rest and therefore the pressures surrounding the seal are identical, the predeformed elastomer tries to regain its original shape. In so doing, it applies itself against the supporting course 64 and exerts a slight force on it. Thus, the valve that it forms at the upper opening of the bore 63 is closed in advance as shown in FIGS. 2 and 6.

Figure 3:
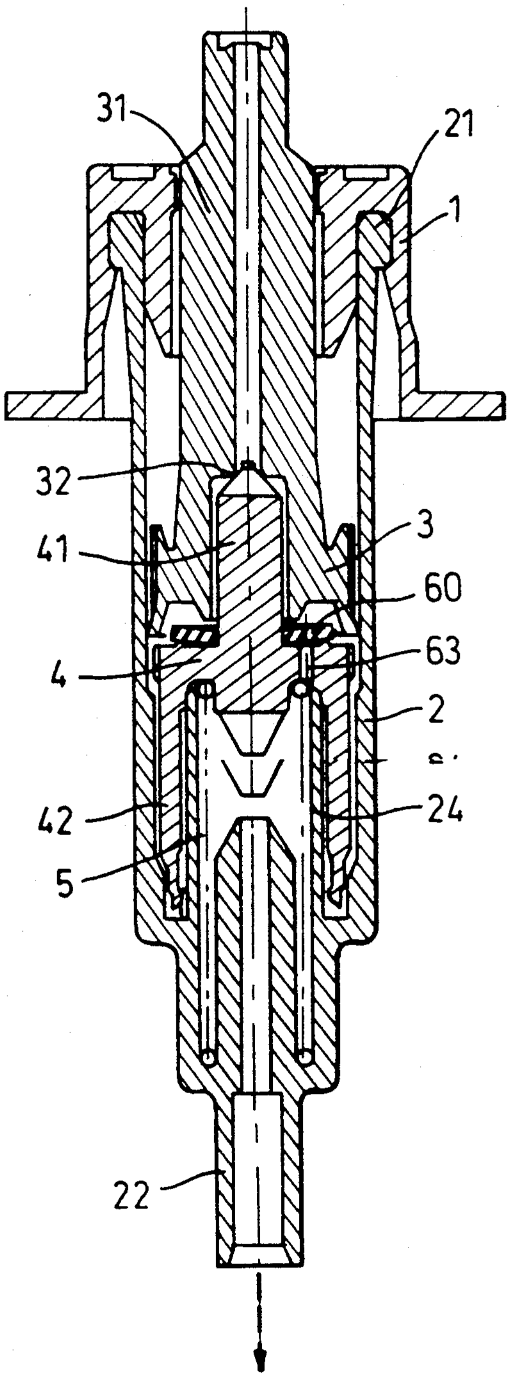
Figure 4:
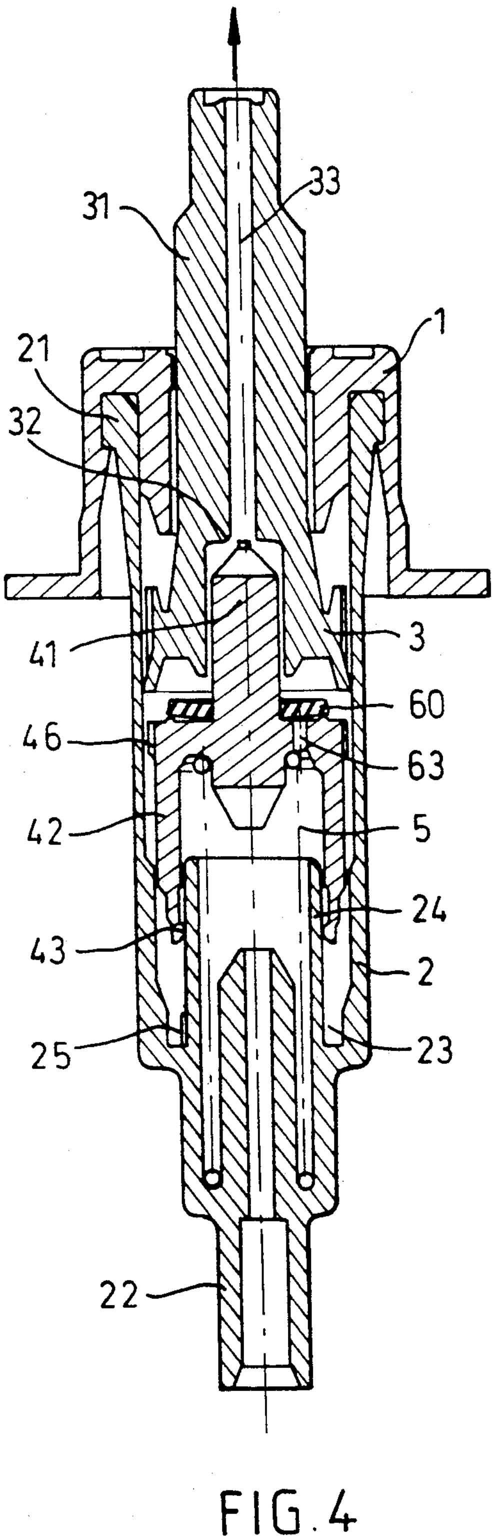

When the first piston 3 is pressed in by the user, everything happens from this point as in the unimproved precompression metering-proportioning pump. The pressure increase which then develops in the pump's working space 23 only reinforces the application of the seal 60 against the supporting course 64 and therefore the tightness of this closure. In addition, the fact that the seal 60 is wedged between the embossment 61 and the shoulder 44 provides the seal at the level of the surface 65 of the shoulder 44 located at the base of the valve spindle 41. In the priming phase (see FIG. 3) the compressible air contained in the pump's working space 23 enables the pistons to be pushed in until the notched disengaging device 45 comes to rest against the hollow cylinder 24 of the casing 2. Air is, for example, forced into the vessel containing the product to be discharged through the milling 25 which locally raises the lip 43 of the skirt 42. In the product discharge phase (see FIG. 4), the pressure of the latter ends by actuating the differential piston 4, the spindle 41 of which comes away from the valve seat 32. It is only when the pump's working space 23 has been emptied that the valve formed by the bore 63 and the seal 60 opens.

Figure 7:
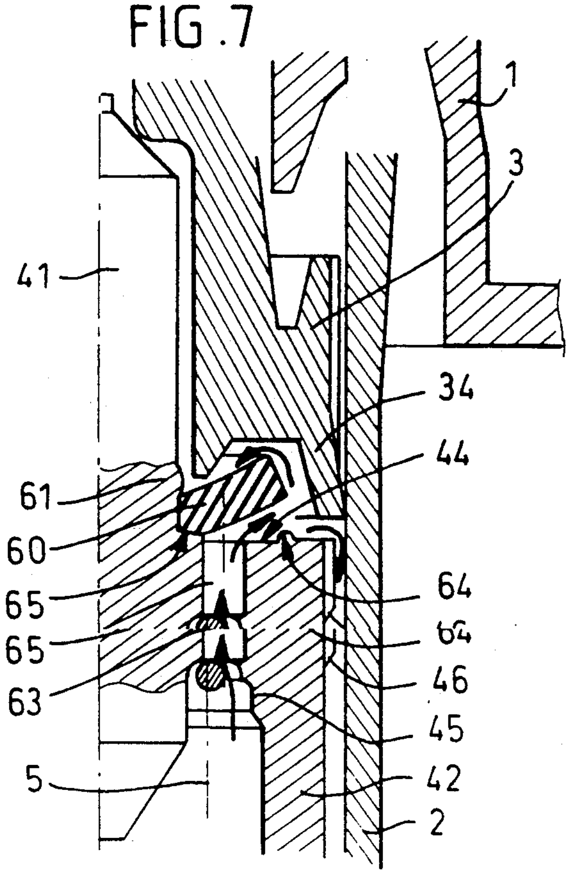
Figure 5:
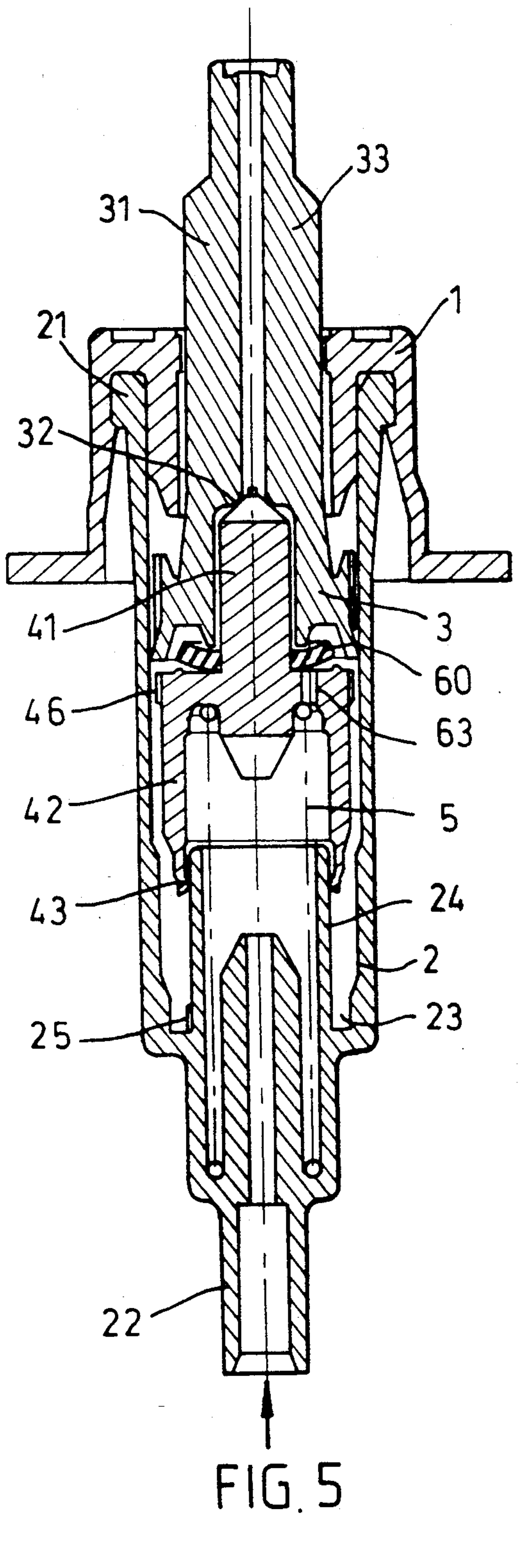

While the working space 23 is increasing in volume, the vacuum in it immediately starts to lift the seal 60. As shown in FIG. 5 and, with greater detail, in FIG. 7, the outer periphery of the seal 60 then comes away from the supporting course 64. Through the annular cavity 35 in the piston 3, the seal 60 is not impeded in its pivoting movement. From this moment, the product is sucked from inside the skirt 42 through the bore 63 to the pump's working space 23 (see arrows in FIG. 7). The raising of the seal 60 is also facilitated by the prior deformation imposed on it. This can be such that the force of pressure exerted by the seal 60 against the supporting course 64 is relatively low. A slight vacuum is therefore sufficient to overcome it.

Finally, as soon as the pump's working space 23 is again full, the seal 60 is again applied against the supporting course 64. The fact that it is wedged against the base of the valve spindle 41 guarantees this return movement which therefore ceases to be random. In addition, it happens almost instantaneously.

Figure 8:
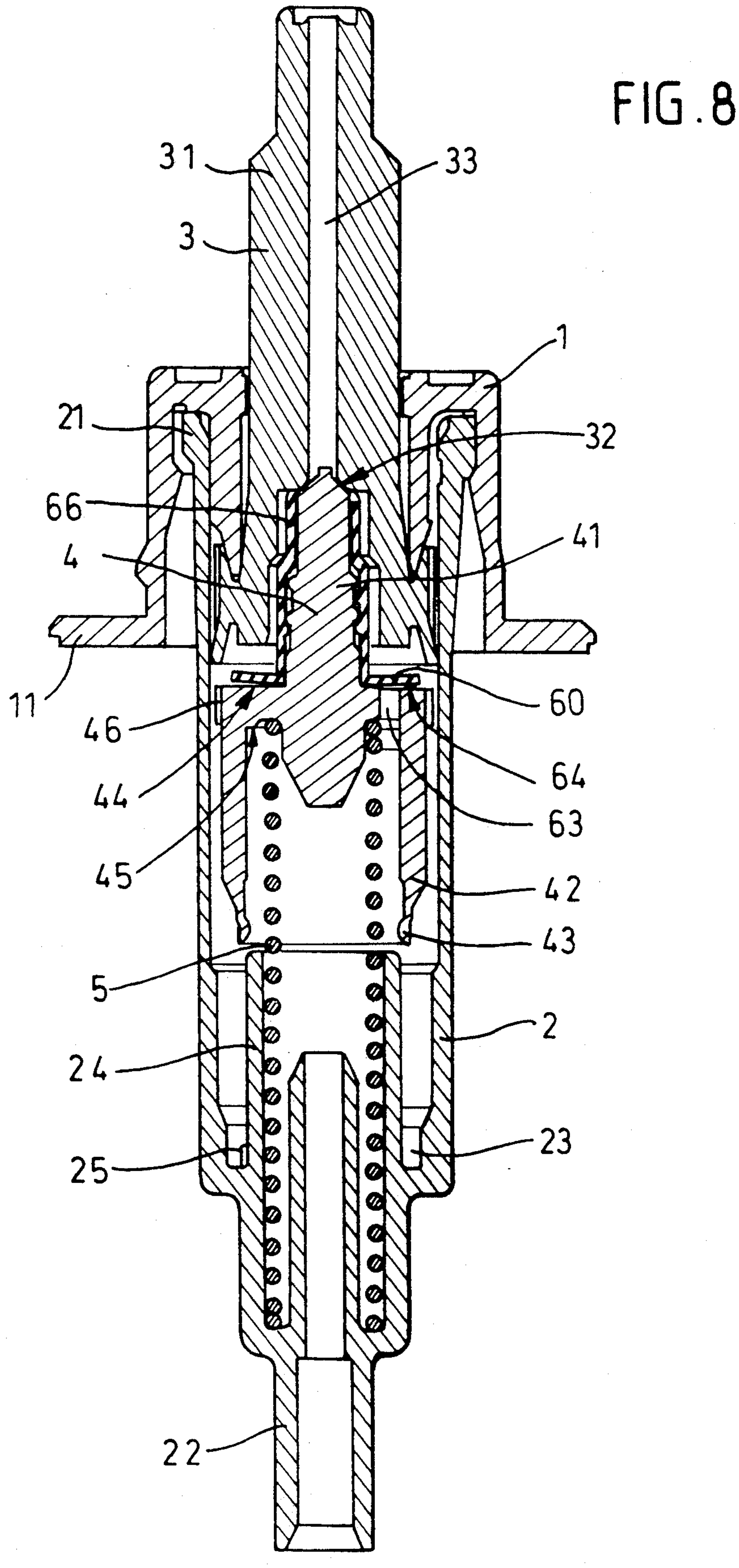
FIG. 8 is a longitudinal section of the precompression metering-proportioning pump in FIG. 1, but this time including a second embodiment of the present improvement. The pump is shown in the idle position.

A second embodiment of the present improvement uses a ring made of plastics material instead of the elastomer seal. A pump improved in this way appears as shown in. FIG. 8. The corresponding longitudinal section is comparable to that in FIG. 2. Elements playing similar roles in the operation of both embodiments have therefore been given the same reference numbers.

Here too, the modifications involved in the present improvement concern the two pistons of the precompression metering-proportioning pump of the prior art. There follows a list of these modifications with reference to detail FIGS. 9 and 10:

a) the differential piston 4 comprises, for example, the same bore 63 as in the first embodiment. In other words, it is a small cylindrical hole creating a link between the inside of the skirt 42 and the surface of the shoulder 44. A local notch in the end of travel disengaging device 45 held internally by the skirt 42 is also provided so that the spring 5 does not block this link;

b) this time, not only does the base of the piston 3 have a cavity but also the part of the internal channel 33 of the hollow rod 31 which is ahead of the valve seat 32 is enlarged. This is followed by a space 35 of slightly more complex form. For example, the internal channel 33 of the piston 3 is widened twice (if we consider it in the reverse direction to the flow of the product). The first widened section is actually the valve seat 32 of the prior art pump. A second widened section 37 is now added, located approximately halfway between the seat 32 and the base of the piston 3.

Looking now at the sealing lips of the piston 3 which isolate the pump's working space 23 at the level of the pump casing 2, only the lip 34 directed towards the working space 23 remains as in the first embodiment. The upper lip existing in the unimproved pump is again replaced by guide vanes 36.

In this second embodiment, a ring 60 is disposed against the shoulder 44 of the differential piston 4 to act as a non-return valve. It is integral with a sleeve 66 surrounding the valve spindle 41 which is located in the different cavities of the internal channel 33 of the piston 3 described above.

In the context of the present improvement, it is fundamental that, notably when the pump is at rest, the sleeve 66 of the ring 60 is pressed axially against the shoulder 44 of the piston 4. This is obtained by extending the sleeve 66 practically to the tip of the spindle 41 so that its open end can be supported against the valve seat 32. In fact, the height of the sleeve 66 is a little greater than the axial distance then separating the shoulder 44 from the differential piston 4 and the valve seat 32. So the sleeve 66 coming to rest against the seating 32 is accompanied by a slight buckling. In order to control it better despite variations in the sizes of the molded parts (tolerance of the order of one tenth of a millimeter), the sleeve 66 does not have a constant diameter. Of smaller diameter at its open end, it presents a widened section 67 approximately at its halfway point (that is opposite the widened section 37 of the internal channel 33 of the piston 3). Two annular embossments 62 are advantageously located inside the widened section.

The spindle 41 also has two comparable annular embossments 61. One is located, for example, between the widened section 67 of the sleeve 66 and a first embossment 62 while the other is between the two embossments 62 of the sleeve 66. Axial clearance is also maintained between complementary embossments. In this way, the buckling occurs only through swelling of the widened section of the sleeve 66, which eliminates all risk of deformation of other sorts. Thus, the ring 60 is in turn forceably deformed in similar fashion to the seal in the first embodiment.

It rests simultaneously on a small surface 65 surrounding the spindle 41 and on a circular supporting course or bead 64, the center of which is on the axis of the spindle 41 and which is fitted beyond the bore 63. Now, the course 64 projects from the shoulder 44 at a higher level than the surface 65. The ring 60 which is pressed through the intermediary of its sleeve 66 against the latter therefore tends to warp. And, as in the first embodiment, a concave shape is thus maintained, the ring 60 pivoting slightly towards the valve spindle 41. In reaction, the ring 60, which has a certain rigidity, is then applied sufficiently to the supporting course 64 to guarantee the tightness of the corresponding contact. Further, the contact at the surface 65 is then tight to the extent that any link between the vessel and the pump's working space 23 through the bore 63 is completely broken.

In the implementation of this characteristic, the free end of the sleeve 66 advantageously comprises one or more notches 68 to avoid impeding the flow of the product when it is discharged through the channel 33. It is preferably bevelled so that the piston 3 still remains centered around the sleeve 66. This deformation characteristic imposed beforehand on the element 60 blocking the bore 63 also renders the operation of this second embodiment theoretically perfectly reproducible. When the user presses in the hollow rod of the piston 3 to actuate the pump, he first initiates a downward movement of the differential piston 4, the valve spindle 41 of the latter resting against the valve seat 32. During this short transient phase, the ring 60 remains pressed against the shoulder 44 since the relative position of the two pistons 3 and 4 is the same as when the pump is idle. In this way, the pump's working space 23 is totally isolated both from the outside and from the vessel containing the product exactly as in the unimproved pump. At the same time, the pump's working space 23 decreases in volume, and the pressure of the product which it encloses increases, and ends up reaching the precompression value capable of causing the differential piston 4 to move away from the piston 3.

We are then in the product discharge conditions illustrated in FIG. 9. In other words, the valve spindle 41 is detached from the valve seat 32 while the pressure of the product is applied to the shoulder 44 of the differential piston 4. However, it is no longer applied there directly. It is in fact exerted on the ring 60. Although this in no way changes the operation of the differential piston 4, the ring 60 is held firmly against the shoulder 44. Because of this, the sleeve 66 can, by remaining in place on the spindle 41, move away from the seat 32 and allow room for the product as shown by the double arrows in FIG. 9.

When the differential piston 4 finally comes to rest against the hollow cylinder 24 of the pump casing 2 level with its end of travel disengaging device 45, the volume of the pump's working space 23 stops decreasing. The pressure of the product immediately starts to fall so that the differential piston 4 is reapplied level with its spindle 41 against the valve seat 32. From this moment, the sleeve 66 is again compressed by this seat 32 which consequently takes over the pressure of the product.

It is then that the user generally releases his pressure on the rod 31 of the piston 3. Immediately, the spring 5 causes the two pistons to move back upwards simultaneously in firm contact with each other at the level of the valve seat 32. The sleeve 66 stays axially pressed between the seat 32 and the shoulder 44. The pump's working space 23 at the same time increases in volume and, since it first remains isolated in the same way as in the unimproved pump, it develops a vacuum. In other words, it is now on the side of the ring facing the vessel that the pressure of the product is greatest. So, as soon as the vacuum in the working space 23 becomes sufficient to enable this pressure (which is simply the pressure in the vessel) to overcome the force with which the ring 60 is applied to the supporting course 64, the ring 60 is lifted. As shown in FIG. 10, the ring 60 then tends to pivot towards its sleeve 66, at the same time remaining firmly applied against the surface 65 of the shoulder 44 at the base of the spindle 41. The product in the vessel is from this moment introduced into the pump's working space 23, sucked by the vacuum therein as shown by the double arrows in FIG. 10. This inlet mechanism continues as long as the pistons 3 and 4 are rising into the pump casing 2.

When finally, the pump comprising this second embodiment is at rest, the pressures exerted on either side of the ring 60 by the product become equal. There is therefore nothing opposing the return of the ring 60 against the course 64, this position corresponding to the minimum deformation that the ring can achieve. From this point on, the pump is ready to be reactuated and this will take place exactly as described above, with no random effects Even in the event of aging of the pump equipped with this second embodiment, an acceptable operation of the non-return valve formed by the bore 63 and its sealing ring 60 can be guaranteed. Creepage of the ring 60 can be expected to the extent that the force with which it is applied to the supporting course 64 is reduced with the passage of time. It will, however, still remain sufficient to close the valve when the pistons begin to descend. Thereafter, it is the pressure of the product itself contained in the pump's working space that will reinforce this closing pressure.

With respect to the examples that have just been described in detail, the present improvement can, where applicable, allow for the existence of a number of bores 63. The number nevertheless is limited to a maximum of three. The differential piston 4 is a part of molded plastics material. Increasing the number of bores 63 would weaken it because of the reduced plastic flow linkage quality during molding. The seal or ring 60 can also be molded since it is not necessary to observe an extremely precise adjustment dimension with the valve spindle 41. Finally, the precompression meteringproportioning pump thus improved can be mounted on a vessel not only at atmospheric pressure as has been assumed up to this point, but also at a slight vacuum (for example up to 1.5 bars).

Figure 11:
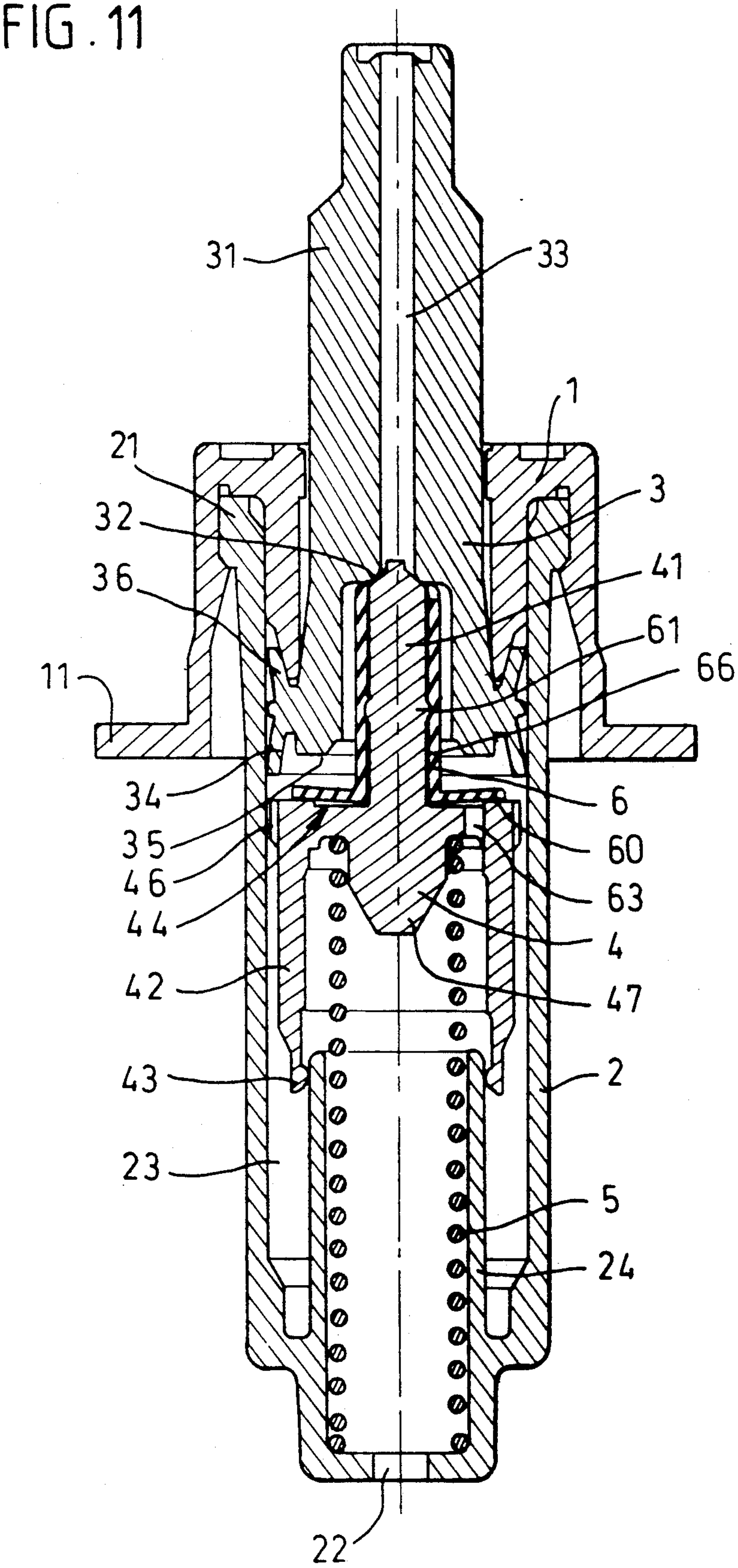
FIG. 11 is a longitudinal section of another precompression metering-proportioning pump including the present improvement, adapted to be used together with a vacuum vessel.

It is also advantageously fixed on a vessel with a slight depression inside it. This particularly arises when the pump is associated with a vacuum vessel, the walls of which deform as it is emptied, but fail to perfectly adapt themselves to the reduction of the content volume due to a certain mechanical resistance. For that purpose the metering pump must however be designed in a slightly different way when compared to the pump described above. FIG. 11 shows how it could be designed.

The difference resides in the fitting or engagement of the skirt 42 of the differential piston 4 around the hollow cylinder 24. The fitting now always remains, even when the pump is in the rest position as represented. For that purpose, the respective lengths of the skirt 42 and of the cylinder 24 may be accordingly chosen. An isolation of the pump's working space 23 with respect to the vessel. Thus results even in the rest position.

This point is of particular interest when the product must not be exposed to some air in order to keep its properties and to be preserved from contamination or oxidation. It avoids the product in the vessel from coming into contact with the air which has penetrated in the pump working space 23 following leakages taking place at the sealing lip 34 of the piston 3.

We claim:

1. An improved precompression metering-proportioning pump, said pump enabling a product to be discharged under pressure through the cooperation of five cylindrical parts having a common axis, namely:

a) a hollow coupling-sleeve (1), b) a hollow casing (2) having two open end, said coupling-sleeve being secured to said first end (21) of said hollow casing, and a hollow cylinder (24) having an open section extending from said second end (22) of said hollow casing, c) a first piston (3) mounted to slide in an airtight fashion inside said hollow casing between a first and a second position, said first piston being applied against said coupling-sleeve in said first position, and having a hollow rod (31) extending through said first end of said hollow casing and having a valve seat (32) on its inside thereof, d) a differential piston (4) mounted to slide inside said hollow casing and comprising a shoulder (44) facing said first end of said hollow casing, said differential piston being integral with a valve spindle (41) which extends towards said first end of said hollow casing and which is engaged in said hollow rod of said first piston so as to cooperate with said valve seat, said differential piston being integral wit a skirt (42) which extends towards said second end of said hollow casing and having an outer guiding surface and an inner surface provided with an indentation (45) and a sealing lip (43), said skirt engaging said hollow cylinder (24) such that said sealing lip fits around said hollow cylinder (24) at least as soon a said first piston leaves said first position, said second position of said first piston being reached when said open section of said hollow cylinder comes to rest against said indentation of said inner surface of said skirt, and e) a return spring (5) disposed between said differential piston and said second end of said hollow casing, said differential piston defining at least one bore (63) extending from said inner surface of said skirt to said shoulder, a cylindrical sealing element (60) fitted around said valve spindle and being adapted to be applied against said shoulder level with two annular contacts between which said bore opens to form a non-return valve at the opening of said bore, and an open space (35) around said shoulder so that said sealing element can detach from said shoulder, wherein, when said pump is at rest, said sealing element is kept deformed so that it is applied against said shoulder with sufficient force to guarantee a seal against said two annular contacts.

2. A pump according to claim 1, wherein one of said two annular contacts between said sealing element and said shoulder comprises a supporting bead (64) projecting from said shoulder between said bore and said outer surface of said skirt, another of said two annular contacts being implements on a surface (6) of said shoulder located immediately next to said valve spindle and set back from said supporting bead (64), a seal against said first contact being broken when said non-return valve opens, while a seal against said second contact is maintained permanently, said open space around said should being adapted to allow said sealing element to bend towards said valve spindle when the seal against said first contact is broken.

3. A pump according to claim 2, wherein said sealing element is an elastomer seal having a central hole and an outer periphery; and, when said metering-proportioning pump is at rest, said sealing element is kept deformed by:

a) said valve spindle, said central hole of said seal having a diameter less than that of said valve spindle so that fitting said seal onto said valve spindle causes deformation of said seal; and b) an embossment (61) in said valve spindle located at a distance from said shoulder of said differential piston such that once fitted onto said valve spindle said seal is wedged level with said central hole between said embossment and said shoulder.

4. A pump according to claim 3, wherein said open space (35) around said shoulder comprises an annular cavity in said first piston.

5. A pump according to claim 2, wherein said sealing element is a flange ring made of a plastics material having a central bore surrounded on one side by a cylindrical hollow sleeve (66) which is adapted to fit onto said valve spindle and which has an open end; and, when said pump is at rest, said valve seat of said first piston is applied to said open end and presses said sleeve axially against said surface (645) of said shoulder immediately next to said valve spindle.

6. A pump according to claim 5, wherein said open end of said sleeve comprises at least one notch (68) so that the presence of said sleeve does not impede the passage of said product when it is discharged.

7. A pump according to claim 5, wherein said open end of said sleeve is bevelled so that said first piston is automatically centered on said sleeve.

8. A pump according to claim 5, wherein said cylindrical sleeve comprises, approximately at a halfway position, an enlargement (67) causing the diameter of said open end to change rapidly to that of a widened section, at least two annular embossments (62) being defined inside said widened section between which is positioned, with an axial clearance compatible with the tolerance of the parts, and an annular embossment (61) on said valve spindle so that said sleeve is deformed by buckling rather than becoming distended level with said widened section.

9. A pump according to claim 8, wherein the open space (35) around said shoulder comprises a cylindrical cavity having as an axis of revolution said common axis of said parts of said pump, said cavity extending from said valve seat and presenting a widened section 937) level with said widened section of said sleeve.

10. A pump according to claim 1, wherein said bore (63) is a cylindrical channel with an axis parallel to said common axis of said parts of said pump.

11. A pump according to claim 1, wherein said indentation (45) of said inner surface of said skirt is notched so as to enlarge a beginning of said bore (63).

12. A pump according to claim 1, wherein there are a plurality of bores (63) in said differential piston, and said bores are molded together with said differential piston.

13. A pump according to claim 1, wherein said first piston slides in an airtight fashion inside said hollow casing via a single peripheral sealing lip (34) directed towards said second end of said hollow casing.

14. A pump according to claim 1, wherein said sealing element is produced by molding.

15. A pump according to claim 1, adapted for use with a vacuum vessel, wherein respective lengths of said hollow cylinder (24) and of said skirt (42) of said differential piston are such that said sealing lip (43) always remains fitted around said hollow cylinder when said first piston is in said first position.

* * * * *